June 24, 1930.  B. C. LORING  1,765,843
IDENTIFYING ATTACHMENT FOR MOTOR VEHICLES
Original Filed Oct. 4, 1928
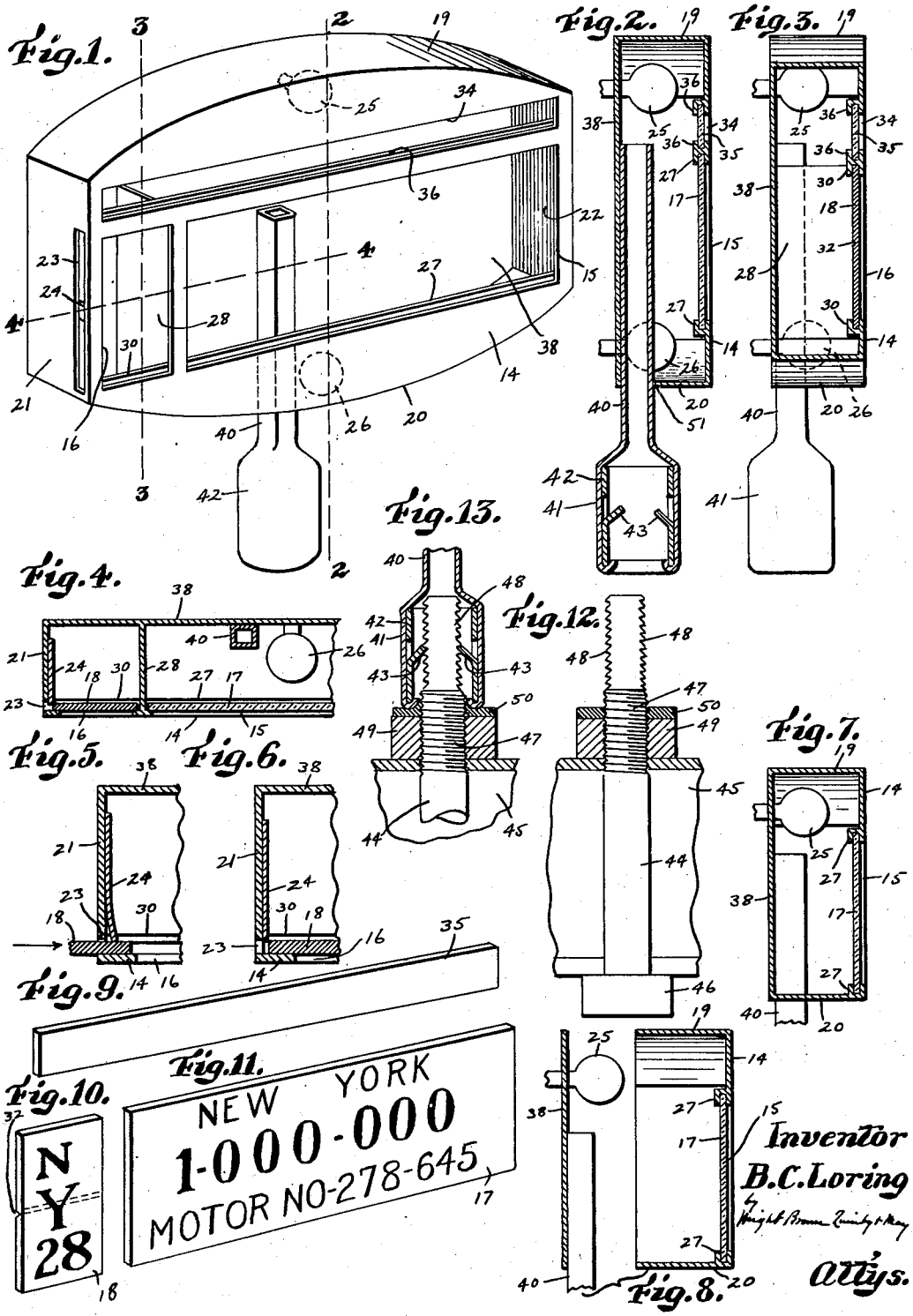
Inventor
B. C. Loring Patented June 24, 1930

1,765,843

UNITED STATES PATENT OFFICE

BENJAMIN C. LORING, OF NEW YORK, N. Y., ASSIGNOR TO ROSANA C. LORING, OF DETROIT, MICHIGAN

IDENTIFYING ATTACHMENT FOR MOTOR VEHICLES

Application filed October 4, 1928, Serial No. 310,290. Renewed November 23, 1929.

This invention is embodied in an attachment adapted to be secured to a motor vehicle frame, and including a casing having an outer wall which may face either rearward or forward as an element of either a rear or a front signal, a light-transmitting license plate inseparably secured to and sealed in the casing, and visible through the outer wall thereof, the license plate constituting a permanent or non-renewable element, and a dated symbol-plate which is insertable in the casing, visible through the outer wall thereof and automatically locked in the casing, so that it can be removed only when broken into fragments, its removal preventing its further use on another vehicle, the attachment including illuminating means adapted to project light through the license plate, so that the latter may be clearly seen at night.

When the attachment is embodied in a rear signal, the outer wall of the casing includes a narrow elongated light-transmitting stop signal strip, located above the license and symbol plates, the illuminating means including a lamp adapted to be lighted by a movement of the vehicle brake pedal to give a stop warning.

The casing is provided with means whereby it may be inseparably locked or coupled to the frame of a motor vehicle.

The objects of the invention will be apparent from the foregoing and from the following description:

Of the accompanying drawings forming a part of this specification,—

Figure 1 is a perspective view of the casing element of a rear signal embodying the invention, the license and symbol plates, and the stop signal strip being omitted, to show the interior of the casing.

Figure 2 is a section on the plane indicated by line 2—2 of Figure 1, showing the license plate and the stop signal strip in section, in their operative positions.

Figure 3 is a section on the plane indicated by line 3—3 of Figure 1, showing the symbol plate and the stop signal strip in section in their operative positions.

Figure 4 is a section on the plane indicated by line 4—4 of Figure 1, showing the symbol plate and a portion of the license plate in section.

Figures 5 and 6 are fragmentary sections, showing the left hand end portion of Figure 4, and illustrating the operation of automatically locking the symbol plate in the casing.

Figure 7 is a view similar to Figure 2, showing the casing and license plate of an attachment embodying the invention, adapted for use at the front end of a vehicle.

Figure 8 shows the inner side wall of the casing shown by Figure 7, separated from the major portion of the casing, which includes the outer side wall and the marginal walls.

Figure 9 is a perspective view of the stop signal strip.

Figure 10 is a perspective view of the symbol plate.

Figure 11 is a perspective view of the license plate.

Figure 12 shows a locking coupling member fixed to a member of the vehicle frame, and engageable with a complemental locking coupling member, fixed to the casing and showing by Figure 2.

Figure 13 shows in interengaged relation, the locking coupling members shown by Figures 2 and 12.

The same reference characters indicate the same parts in all of the figures.

My improved attachment comprises a casing or box, preferably composed of sheet metal, and including an outer side wall 14, having openings 15 and 16. The opening 15 is formed to expose the license plate 17, shown separately by Figure 11, and the opening 16 is formed to expose the symbol plate 18, shown separately by Figure 10.

Fixed to the outer side wall are narrow inwardly projecting marginal walls including a top wall 19, a bottom wall 20, and opposite end walls 21 and 22. The end wall 21 is provided with a symbol plate-receiving slot 23, and an internal detent 24, whose function is hereinafter described.

The casing is provided with internal illuminating means, including an electric lamp 25, in the upper portion. When the attachment is adapted for use as a rear end signal, the illuminating means may include an electric lamp 26, in the lower portion of the casing.

The license plate 17 is a permanent or non-renewable element of the attachment and is built into the casing, preferably by confining ears 27, fixed to the outer side wall, as indicated by Figures 1, 2, 7 and 8, and embracing opposite edges of the license plate, one end of said plate abutting the end wall 22, and the opposite end abutting an internal partition 28 (Figures 1 and 4).

The license plate 17 is of light-transmitting material, preferably so-called non-breakable glass, which is not colored, and is provided with characters such as those shown by Figure 11, which are translucent, and visible by artificial light transmitted from within the casing, through the plate, and by daylight impinging on the outer surface of the plate.

When the attachment is adapted for use at the rear end of a vehicle, the license-plate characters are preferably red. In the attachment adapted for use at the front end, the license-plate characters are preferably green.

The symbol plate 18 is preferably of opaque material, such as aluminum, and bears dating characters indicating the year, and symbolic characters indicating a State.

The symbol plate is insertable in the slot 23, and guided during its insertion by confining ears 30 (Figures 1, 3, 4, 5 and 6). The detent 24 is preferably a resilient metal strip attached at one end to the end wall 21, and having a free end projecting slightly across the slot 23, as best shown by Figure 6, the arrangement being such that when the symbol plate 18 is being pushed into the slot 23, as indicated by Figure 5, the free end of the detent is slightly displaced, and when the plate is fully inserted, the detent springs against the end wall and slightly overlaps the outer end of the symbol plate, as shown by Figure 6, so that the plate is locked in the casing and cannot be removed, except by breakage of the plate.

The symbol plate may be broken into fragments small enough to be removed through the opening 16, by pressure or force exerted on its exposed outer side. To facilitate such breakage I provide the symbol plate with a weakening groove 32, extending across its inner side, so that pressure exerted on the outer side will break the plate into two equal parts, each removable through the opening 16. The symbol plate when fully inserted, abuts the partition 28, as shown by Figure 4.

It will now be seen that it is impossible to remove the symbol plate and transfer it to the casing of a like attachment on another vehicle, and that when the time comes for renewing the symbol plate, this may be accomplished by breaking the old plate, removing the fragments thereof, and then inserting a new plate, which is automatically locked by the detent in its inserted position.

The casing when adapted as shown by Figures 1, 2, and 3, to face rearwardly, is provided in its outer side wall above the sight openings 15 and 16 with a narrow elongated sight opening 34. A light-transmitting rear signal strip 35, preferably of red glass, is built into the casing, preferably by confining ears 36 (Figures 1, 2 and 3), fixed to the outer side wall, the strip 35 extending from end to end of the casing, so that its ends abut the end walls 21 and 22. The signal strip is arranged to be illuminated by the lamp 25, some of the rays of which may be reflected downward by top wall 19, which has a reflecting inner surface, and is preferably curved, or slightly arched, as shown by Figure 1. The bottom wall 20 may be reversely curved or arched and adapted to reflect light rays from the lamp 26. The lamp 25 may be lighted by the depression of the brake pedal of a motor vehicle, as usual.

When the attachment is adapted for use at the front end of a vehicle, the bottom wall 20 may be flat instead of curved, the stop signal strip 35 and opening 34 being omitted, as indicated by Figures 7 and 8. In all other respects the attachment shown by Figures 7 and 8 may be the same as above described, the attachment including the license plate 17, the symbol plate 18, and the means for automatically locking the symbol plate in its operative position.

The inner side wall of the casing is designated by 38, and is formed to be seated on the exposed edges of the marginal walls 19, 20, 21 and 22. The inner side wall 38 is rigidly secured to the marginal walls, preferably by electric welding.

As indicated by Figure 8, the casing is composed of a major portion including the outer side wall 14 and the marginal walls, and a minor portion formed by the inner side wall 38. The major portion may be formed in a single piece by a stamping or pressing operation, and the several plates may be secured as above described, to the major portion before the inner side wall is applied, the application and securing of the inner side wall closing and sealing the casing.

I utilize the inner side wall 38 to carry the illuminating means, the bulbs 25 and 26, or the bulb 25 only, being fixed to the wall 38, and located by the application of said wall to the major portion of the casing.

The attachment preferably includes a supporting standard or shank 40, electrically welded, or otherwise fixed to the inner side wall 38, and provided at its lower end with a locking coupling member engageable with a complemental locking coupling member fixed to a part of a motor vehicle, the arrangement being such that the standard 40 may be quickly and rigidly secured to support the casing in a predetermined position.

The preferred embodiment of the locking coupling members is as shown by Figures 2 and 13. The standard 40 is provided with an enlargement or socket 41, containing a sleeve 42, on which are formed two opposed spaced apart inclined dogs or pawls 43.

The complemental locking coupling member is a bolt 44, inserted in orifices formed for its reception in a member 45, of the vehicle frame, and provided with a head 46, a threaded portion 47, and a flat sided upper end portion, on two sides of which are formed ratchet teeth 48, adapted to engage the dogs 43, when the standard socket 41 is forced down on to the bolt, as shown by Figure 13. The bolt is secured by a nut 49, having a compressible washer 50, which is indented by the lower end of the socket 41, and seals the open end of the socket, as shown by Figure 13.

The standard 40 is preferably welded to the inner side of the side wall 38, and extends through a slot at 51 (Figure 2) in the bottom wall 20. It will be seen that the operation of securing the inner side wall 38 to the major portion of the casing, provides the attachment not only with illuminating means, but also with a supporting standard, adapted to be interlocked with a suitable member fixed to the frame.

The characters on the license plate of the attachment adapted for use at the front end, sufficiently obstruct light transmitted through said plate to enable the attachment to serve as a non-glaring head-light.

I claim:

1. An identifying attachment for motor vehicles, comprising a casing having openings in one side formed to expose a license plate and a symbol plate within the casing, a symbol plate-receiving slot in one end, and an internal detent adapted to automatically lock a symbol plate inserted in the casing through the slot, illuminating means within the casing, a light-transmitting license plate built into the casing and visible through one of said openings, and a dated symbol plate inserted in said slot and locked within the casing by said detent, the symbol plate being exposed to breaking force and separable from the casing only when broken.

2. An identifying attachment for motor vehicles, as specified by claim 1, the casing having a narrow elongated opening located above the license and symbol plate openings and formed to expose a signal strip in the casing, the attachment comprising also a light-transmitting signal strip built into the casing and visible through said narrow opening.

3. An identifying attachment for motor vehicles, as specified by claim 1, the symbol plate being weakened so that it may be broken into fragments removable through the symbol-plate opening.

4. An identifying attachment as specified by claim 1, the casing being composed of a major portion which includes an outer side wall, and top, bottom, and end walls projecting from the outer wall, and a closed inner side wall fixed to the top, bottom and end walls, and sealing the casing, the outer side wall containing the sight openings and having confining means engaging the license plate and the symbol plate, the symbol plate-receiving slot being formed in one of the end walls, the inner side wall supporting the illuminating means, and being attachable to the top, bottom, and end walls to close and seal the casing after the plates have been secured in the major portion of the casing.

5. An identifying attachment as specified by claim 1, the casing being composed of a major portion which includes an outer side wall, and top, bottom, and end walls projecting from the outer wall, and a closed inner side wall fixed to the top, bottom, and end walls, and sealing the casing, the outer side wall containing the sight openings and having confining means engaging the license plate and the symbol plate, the symbol plate-receiving slot being formed in one of the end walls, the inner side wall supporting the illuminating means, and being attachable to the top, bottom, and end walls to close and seal the casing after the plates have been secured in the major portion of the casing, the attachment including also a supporting standard fixed to the inner side wall and provided with a locking coupling member engageable with a complemental coupling member, fixed to a part of a vehicle, said standard being secured to the casing by the operation of securing the inner side wall to the major portion of the casing.

In testimony whereof I have affixed my signature.

BENJAMIN C. LORING.